United States Patent
Park et al.

(10) Patent No.: US 7,889,674 B2
(45) Date of Patent: Feb. 15, 2011

(54) ZIGBEE NETWORK DEVICE FOR ASSIGNING ADDRESSES TO CHILD NODES AFTER CONSTRUCTING CLUSTER-TREE STRUCTURE, ADDRESS ASSIGNING METHOD AND ROUTING METHOD

(75) Inventors: Jong-hun Park, Suwon-si (KR); Jian liang Zheng, New York, NY (US); Myung-jong Lee, New York, NY (US)

(73) Assignees: Samsung Electronics Co., Ltd., Suwon-si (KR); City University of New York, New York, NY (US)

(*) Notice: Subject to any disclaimer, the term of this patent is extended or adjusted under 35 U.S.C. 154(b) by 1588 days.

(21) Appl. No.: 11/198,168

(22) Filed: Aug. 8, 2005

(65) Prior Publication Data

US 2006/0029002 A1  Feb. 9, 2006

Related U.S. Application Data

(60) Provisional application No. 60/599,056, filed on Aug. 6, 2004.

(30) Foreign Application Priority Data

Apr. 15, 2005  (KR) ................................ 2004-31554

(51) Int. Cl.
*H04L 12/28* (2006.01)

(52) U.S. Cl. ....................................................... 370/254
(58) Field of Classification Search ................. 370/378, 370/379, 254
See application file for complete search history.

(56) References Cited

U.S. PATENT DOCUMENTS

| | | | | | |
|---|---|---|---|---|---|
| 5,161,156 | A | * | 11/1992 | Baum et al. ..................... | 714/4 |
| 5,995,503 | A | * | 11/1999 | Crawley et al. ............. | 370/351 |
| 6,553,002 | B1 | * | 4/2003 | Bremer et al. .............. | 370/254 |
| 6,611,872 | B1 | * | 8/2003 | McCanne .................... | 709/238 |
| 6,788,650 | B2 | * | 9/2004 | Chen et al. .................. | 370/254 |
| 2002/0169833 | A1 | * | 11/2002 | Tani et al. .................... | 709/205 |
| 2004/0003111 | A1 | * | 1/2004 | Maeda et al. ............... | 709/237 |
| 2005/0180447 | A1 | * | 8/2005 | Lim et al. .................... | 370/432 |
| 2005/0265259 | A1 | * | 12/2005 | Thubert et al. ............. | 370/255 |
| 2006/0029002 | A1 | * | 2/2006 | Park et al. ................... | 370/254 |

* cited by examiner

*Primary Examiner*—Daniel Wu
*Assistant Examiner*—Frederick Ott
(74) *Attorney, Agent, or Firm*—Sughrue Mion, PLLC

(57) ABSTRACT

An address assigning method in a ZigBee network environment formed of a plurality of devices (or nodes), includes: linking the plurality of nodes in a cluster-tree structure; requesting desirable address blocks from a lowest level to a second highest level of the tree ancestor nodes desirable address blocks, respectively; and assigning the desired address blocks to descendents using a top-down procedure.

11 Claims, 11 Drawing Sheets

ZIGBEE NETWORK DEVICE FOR ASSIGNING ADDRESSES TO CHILD NODES AFTER CONSTRUCTING CLUSTER-TREE STRUCTURE, ADDRESS ASSIGNING METHOD AND ROUTING METHOD

CROSS-REFERENCE TO RELATED APPLICATIONS

This application claims the benefit under 35 U.S.C. §119(e) of U.S. Provisional Application No. 60/599,056 filed on Aug. 6, 2004 in the United States Patent and Trademark Office, and priority from Korean Patent Application No. 2005-31554 filed on Apr. 15, 2005 in the Korean Intellectual Property Office, the entire disclosures of which are incorporated herein by reference.

BACKGROUND OF THE INVENTION

1. Field of the Invention

The present invention relates in general to a ZigBee network device, an address assigning method and a routing method in a ZigBee network environment. More specifically, the present invention relates to a ZigBee network device for assigning consecutive addresses to its child nodes (lower devices) after constructing a cluster-tree structure, an address assigning method, and a routing method in a ZigBee network environment.

2. Description of the Related Art

ZigBee is a mobile communication technology designed to be simpler and less power consuming than other wireless personal area networks (WPANs) such as a Bluetooth network. A ZigBee network generally requires only a half of the costs of a typical Bluetooth network by minimizing software and related parts used, and it is especially ideal for a home network that is mostly involved in control and sensing.

ZigBee Network standard v0.85[1] defines a cluster tree structure gathering all devices within a personal area network (PAN). Every device joined in this cluster tree structure is assigned a unique address of the cluster tree structure. These addresses are used for routing purposes in a ZigBee network environment.

For address assignment, a ZigBee coordinator defines two network parameters, namely Cm and Lm, in consideration of the size of the network. Cm is a maximum number of lower devices (hereinafter referred to as child nodes) that can be linked to a parent node, and Lm is a maximum level (or depth) of the tree structure.

According to a related art address assigning method in a ZigBee network environment, each child node is assigned an address. In this case, the ZigBee coordinator assigns addresses in consideration of a whole range of probabilities of child nodes that it can have. For instance, suppose that the ZigBee coordinator has an address s. Then, the ZigBee coordinator assigns short address s+1 to a first child node, s+1+$Cskip_{Ls}$ to a second node child, and s+1+2*$Cskip_{Ls}$ to a third child node. And a Cm-th child node is assigned s+1+(Cm−1)*$Cskip_{Ls}$. $Cskip_{Ls}$ can be expressed by the following equation.

$$C_{skip_{Ls}} = \frac{B_L - \overset{L_s}{\underset{k=0}{Q}}(Cm)^k}{Cm^{Ls+1}} \quad \text{[Equation 1]}$$

where $B_L$ is an address block size of the whole network, and $L_s$ is a level of the ZigBee coordinator. $B_L$ can be calculated using Cm and Lm as follows:

$$B_L = \frac{1 - Cm^{Lm+1}}{1 - Cm} \quad \text{[Equation 2]}$$

The ZigBee coordinator transfers Cm and Lm to each coordinator (or node). Accordingly, using the same address assignment algorithm, each coordinator assigns consecutive addresses to its child nodes.

FIG. 1 is a diagram illustrating a related art ZigBee network environment based on the above-described address assignment algorithm. Referring to FIG. 1, a node A is the ultimate (e.g., root) ZigBee coordinator. The address of the node A is assigned to 0, and Cm and Lm are defined as 4, respectively. The node A has child nodes B, C and D. According to Equation 2, the address block size $B_L$ for the ultimate ZigBee coordinator equals to 341. So if the value $B_L$ is substituted for the Equation 1, Cskip of the ultimate ZigBee coordinator is obtained, i.e., 85. This means that addresses of the child nodes B, C and D are separated by an 85-bit address space from one another. For instance, the address of the first child node B is 1, the address of the second child node C is 86, and the address of the third child node D is 171. Also, using the second Equation 2, Cskip of each the child nodes B, C and D at the first level ($L_s$=1) can be calculated, i.e., 21. Therefore, addresses of the child nodes E to G, and I and J at the second level ($L_s$=2) are separated by a 21-bit address space, respectively.

In the cluster-tree based on the address assignment algorithm of FIG. 1, each node assigns addresses using two predetermined constants Cm and Lm for the whole ZigBee network. That is, each node receives Cm and Lm from its parent node, and assigns addresses to its child nodes using the Equations 1 and 2.

On the other hand, the last child node at the bottom of the tree, that is, no more descendant nodes wait for joining the branch, can be attached to the mid-level of a ZigBee cluster tree. However, the use of the above-described address assignment algorithm for the last child node often results waste of addresses. For instance, if a node E in FIG. 1 is the last descendant node or the bottom of the tree, a block of consecutive addresses {3-28} for child nodes of the node E become useless because the node E does not have any child nodes below it. Therefore, a lot of addresses are wasted and are not efficiently used due to the inflexible address assignment.

Another problem with the above cluster-tree is that if a branch was to be re-attached after having been detached, there is no particular tree recovery algorithm. Especially when the branch is to be attached to another point in the tree different from its original attaching point, a new block of consecutive addresses for the branch has to be assigned.

SUMMARY OF THE INVENTION

The present invention provides a ZigBee network device, an address assigning method and a routing method thereof, in which after a cluster tree structure is constructed, address assignment takes place based on a top-down procedure, that is, address blocks of different sizes depending on numbers of child nodes are assigned consecutively starting from a coordinator (or node) at a highest level, so that address waste can be prevented and during link failure, an old address block can be used again for re-attachment of a branch.

According to an aspect of the present invention, there is provided an address assigning method in a ZigBee network environment formed of a plurality of nodes (or devices), the method including: linking the plurality of nodes in a cluster-tree structure; requesting desirable address blocks from a lowest level to a second highest level of the tree ancestor nodes desirable address blocks, respectively; and assigning the desired address blocks to descendent nodes using a top-down procedure.

During the address assigning, a node may consecutively assign address blocks of desired sizes to child nodes in order of attachment.

The method may further include: in each node from the highest level to the second lowest level of the tree, storing a routing table that contains a record of the number of child nodes, branch IDs provided to the child nodes by acceptance order, and address blocks assigned to the child nodes, respectively.

The method further include: breaking down a branch between node 1 and the cluster-tree structure; attaching the node 1 to node 2 among peripheral nodes; in the node 1, transmitting information in a routing table thereof to the node 2; in the node 2, providing a branch identifier (ID) to the node 1, and recording the branch ID and the transmitted information in a routing table thereof; in each ancestor node of the node 2 until the highest level of the tree, receiving the information; and in each of the ancestor nodes of the node 2 until the highest level of the tree, providing a virtual branch ID to the received information, and recording the virtual branch ID and the information in a routing table thereof.

The method may further include: attaching one of child nodes, node 3, of the node 1 to node 4, in the cluster-tree structure; in the node 1, transmitting information in the routing table thereof to the node 3; in the node 3, storing the information from the node 1 in a routing table thereof; in the node 3, transmitting information in the routing table thereof to the node 4; in the node 4, providing a branch ID to the node 3, and recording the branch ID and the information in a routing table thereof; in each ancestor node of the node 4 until the highest level of the tree, receiving the information; and in each of the ancestor nodes of the node 4 until the highest level of the tree, providing a virtual branch ID to the received information, and recording the virtual branch ID and the information in a routing table thereof.

Also, the method may further include: attaching a plurality of nodes at the same level of the cluster-tree structure together, and forming a meshed structure; if another node at the same level is attached, providing a branch ID to the node; receiving information from a routing table of the node; and in the plurality of nodes in the meshed structure, storing the branch ID and the receiving information in corresponding routing tables, respectively.

The construction of the cluster-tree structure with the plurality of nodes may include: in each of the plurality of nodes, setting an acceptance degree to any other node to associate; in node 5, receiving from at least one of peripheral nodes an association request with an acceptance degree for association; in the node 5, choosing a node based on an acceptance degree of the association request; and in the node 5, transmitting an association response to the chosen node, and forming a branch with the chosen node.

Another aspect of the invention provides a routing method in a ZigBee network environment, the method including: constructing a cluster-tree structure with a plurality of nodes (devices); requesting desirable address blocks from a lowest level to a second highest level of the tree ancestor nodes desirable address blocks, respectively; assigning the desired address blocks to descendents using a top-down procedure; in each node from the highest level to the second lowest level of the tree, storing a routing table that contains a record of the number of child nodes, branch IDs provided to the child nodes by acceptance order, and address blocks assigned to the child nodes, respectively; and in a node 1 in the cluster-tree structure, receiving a packet, checking a destination address of the packet, and routing the packet to another node that is assigned an address block inclusive of the destination address.

The packet routing may include: in the node 1, checking a destination address of the packet; in the node 1, checking whether the destination address is included in an address block assigned to a child node thereof; if the destination address is included in the address block, in the node 1, transmitting the packet to the child node of the corresponding address block; and if the destination address is not included in the address block, in the node 1, transmitting the packet to an ancestor node.

Still another aspect of the invention provides an address assigning method of a ZigBee network device, the method including the steps of: constructing a cluster-tree structure with at least one child node (device); receiving a desirable address block request of at least one of the child nodes; combining address block sizes requested of each of the child nodes, respectively, and requesting an ancestor node for an address block in a desirable size; receiving the address block in a desirable size from the ancestor node; and assigning part of the address block to at least one child node in need of the address block, respectively, in order of acceptance.

The method may further include: if the ancestor node does not exist, assigning part of a total address block to at least one child node in need of the address block, respectively, in order of acceptance.

The method may further include: if no child nodes are attached, requesting the ancestor node for an address block in a desirable size for itself.

Still another aspect of the invention provides a ZigBee network device in a cluster-tree structure for a ZigBee network environment, the device including: a communication unit linked between an ancestor node and at least one child node in the cluster-tree structure for communication therebetween; an address block calculator for calculating a desirable size of an address block including address blocks requested by at least one of child nodes, respectively; a controller for controlling the communication unit to request the ancestor node for the address block in the calculated size; and an address block assigning unit for receiving the address block in the calculated size from the ancestor node and assigning part of the address block to at least one of child nodes, respectively, in order of attachment.

The device may further include: an operator for calculating a total address block using predetermined network parameters if the communication unit is not attached to the ancestor node.

The address block assigning unit may divide the total address block and assign part of the address block to at least one of the child nodes, respectively, in order of acceptance.

The device may further include: a memory for storing the number of children, branch IDs provided consecutively to the child nodes, and a routing table containing a record of address blocks assigned to the child nodes, respectively.

If a packet is received through the communication, the controller checks a destination address of the packet, searches the routing table in the memory to find a child node that is assigned an address block containing the destination address, and if the child node is found, the controller controls the communication unit to route the packet to the searched child.

If the child node is not found, the controller controls the communication unit to route the packet to the ancestor node.

If the controller receives information from a routing table of a node attached to the communication unit, the controller provides a branch ID to the node 1, and records the branch ID and the received information in the routing table of the memory.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Exemplary embodiments of the present invention will be described herein below with reference to the accompanying drawings.

Figure 1:
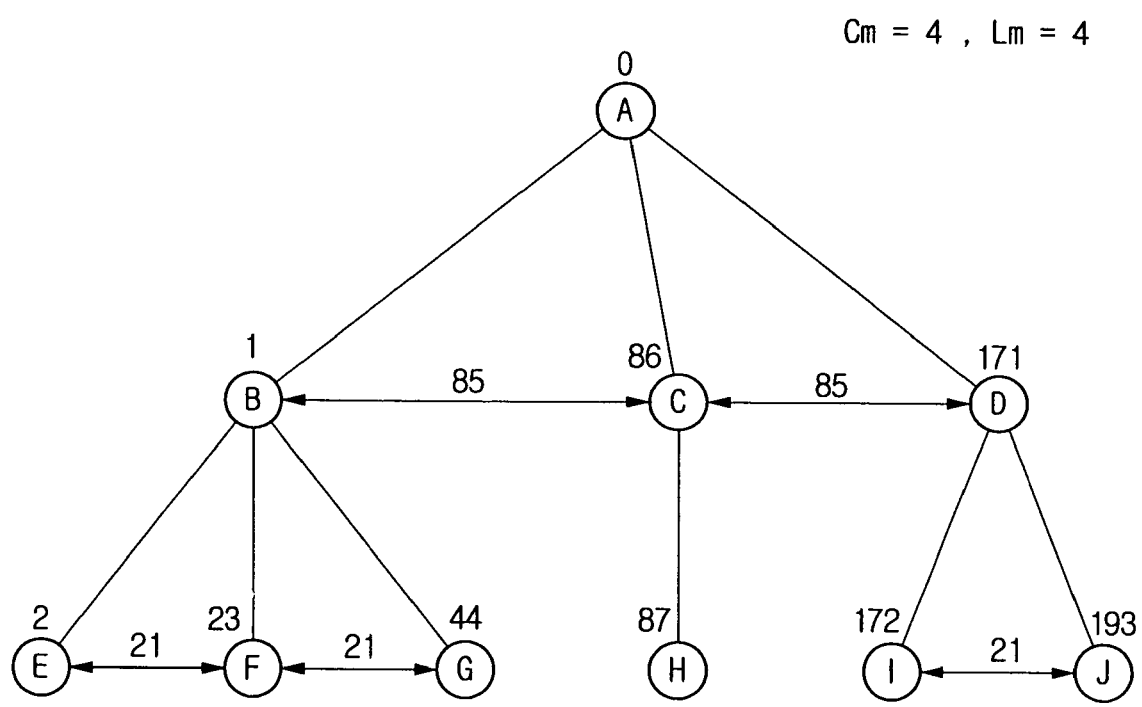
FIG. 1 diagrammatically illustrates a cluster-tree structure for constructing a ZigBee network environment on the basis of a related art address assignment algorithm.
Figure 2:
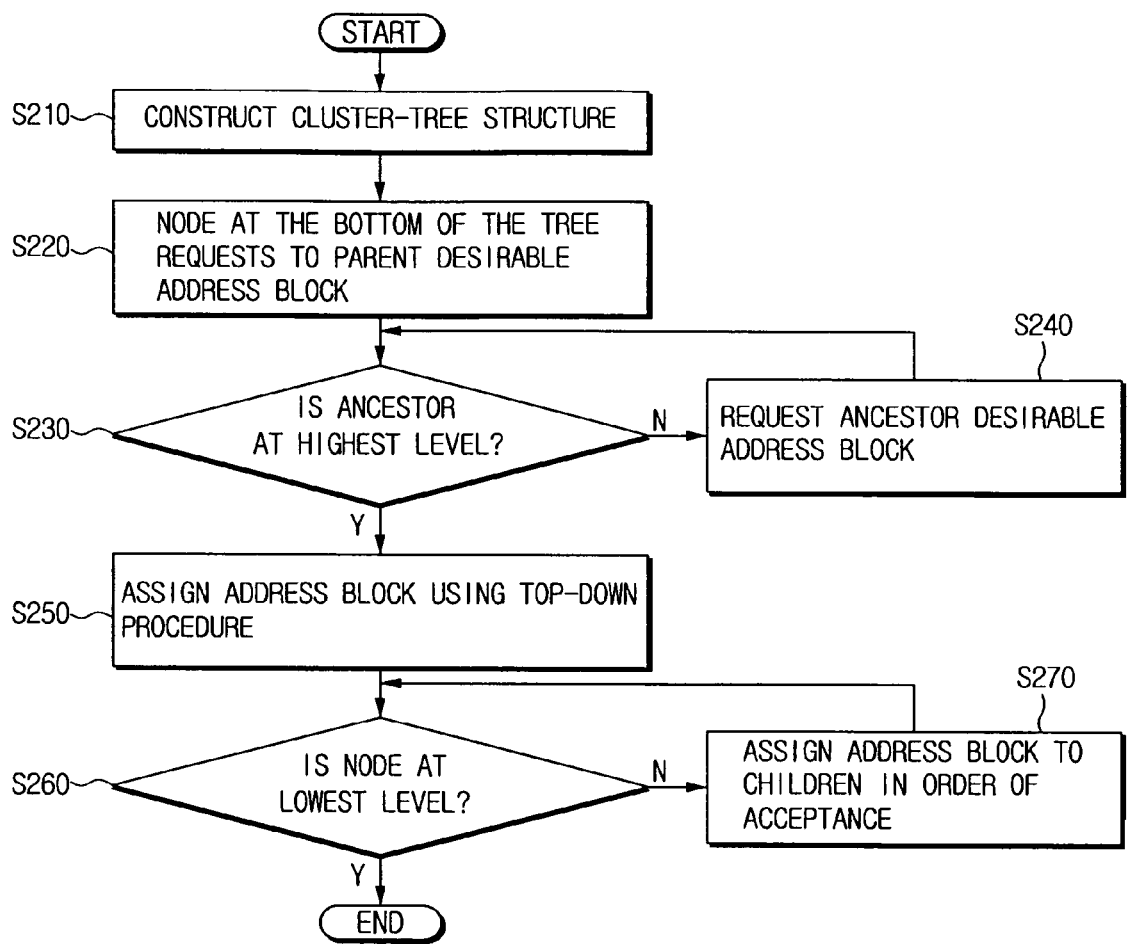
FIG. 2 is a flow chart explaining an address assigning method in a ZigBee network environment in accordance with an exemplary embodiment of the present invention.

FIG. 2 is a flow chart explaining an address assigning method in a ZigBee network environment in accordance with an exemplary embodiment of the present invention. Referring to FIG. 2, during initialization phase, a plurality of nodes (interchangeably used with devices) join the network and a cluster-tree structure is formed (S210). In detail, once an ultimate ZigBee coordinator A as the root is attached, nodes, namely peripheral devices, transmit association request messages to the coordinator A. If the coordinator A wishes to accept the associations, it sends association responses to the nodes. In this manner, child nodes gradually join the network and a tree is formed.

In consideration of capability and other factors, a node uses an acceptance degree to indicate the willingness of acceptance, for instance, four levels of acceptance degrees are set: 3—accept without reservation, 2—accept with reservation, 1—accept with reluctance, and 0—reject. When the acceptance degree is determined, a node transmits an association request message including its acceptance degree to another node. When a node receives a plurality of association request messages, it chooses the node with the highest acceptance degree for association, and sends an association response thereto. In this way, nodes successfully join the network without much difficulty.

In the cluster-tree, nodes are reported from the bottom to top, so a node at the bottom of the tree requests its parent node to give an address block of desired size (S220). That is, a node can have more descendant nodes besides the present child nodes. To this end, a node indicates it wishes to get more addresses for possible future extension. Thus, the node at the lowest level of the tree informs its parent node (i.e., a node at the second lowest level in the tree) of a desirable number of addresses.

Then, the parent node decides whether it belongs to the highest level of the tree, that is, whether it is the root or the ultimate coordinator (S230). If not, the parent node informs its ancestor node of a desirable number of addresses (S240). Of course, the parent node should indicate an enough number of addresses for itself and for its child nodes. And so on. In this manner, the ultimate ZigBee coordinator receives information from all the branches about address block sizes they required.

The ultimate ZigBee coordinator begins to assign address blocks as desired (S250). For address assignment, a top-down procedure is used. Nodes in a branch get addresses in sequence. Unless a node is not in the lowest level of the tree (S260), the node should assign address blocks given from a parent node to its child nodes (S270) according to their wishes. This procedure continues until the bottom of the tree has addresses it wished. In short, each node has an Adaptive Robust Tree Table (ARTT), which is a routing table for tracking branches below it using the addresses assigned to itself. More details on the ARTT will be provided later.

FIG. 3 to FIG. 6 illustrate different examples of cluster-tree structures in a ZigBee network environment to which an address assigning method of the present invention is applied, respectively.

Figure 3:
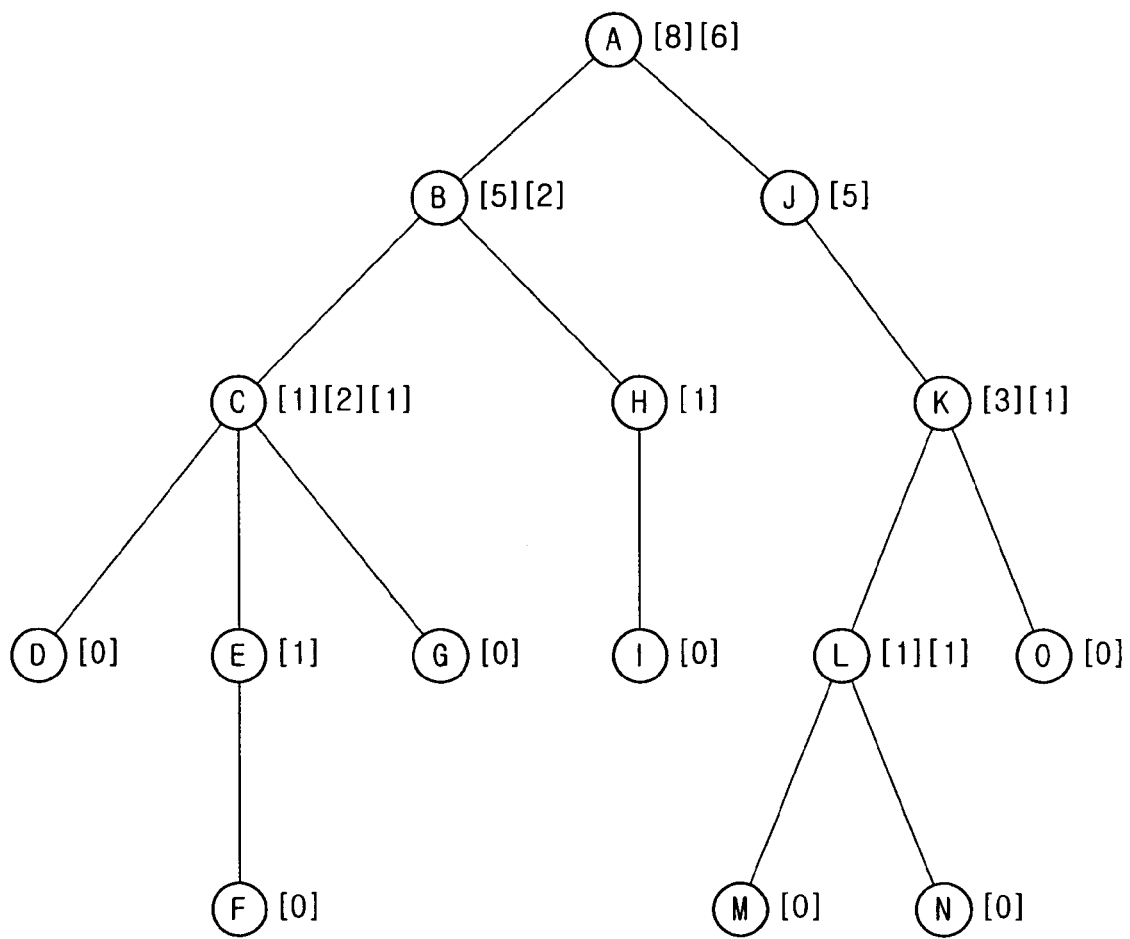
FIG. 3 to FIG. 6 illustrate different examples of cluster-tree structures in a ZigBee network environment to which an address assigning method of the present invention is applied, respectively.

FIG. 3 shows an initialization phase where a plurality of nodes form a cluster-tree structure. Each node uses its own media access control (MAC) address to be attached to another node. For instance, an ultimate ZigBee coordinator A at the highest level of the cluster-tree is attached to two child nodes, respectively. In the cluster-tree, nodes are said to be branched. That is, the node A has two branches below its child nodes B and J on the second highest level of the tree. In FIG. 3, the numbers in the brackets next to each node indicate a total number of child nodes along each branch. For examples, the node A has eight child nodes that belong to the first branch, and six child nodes that belong to the second branch.

Figure 4:
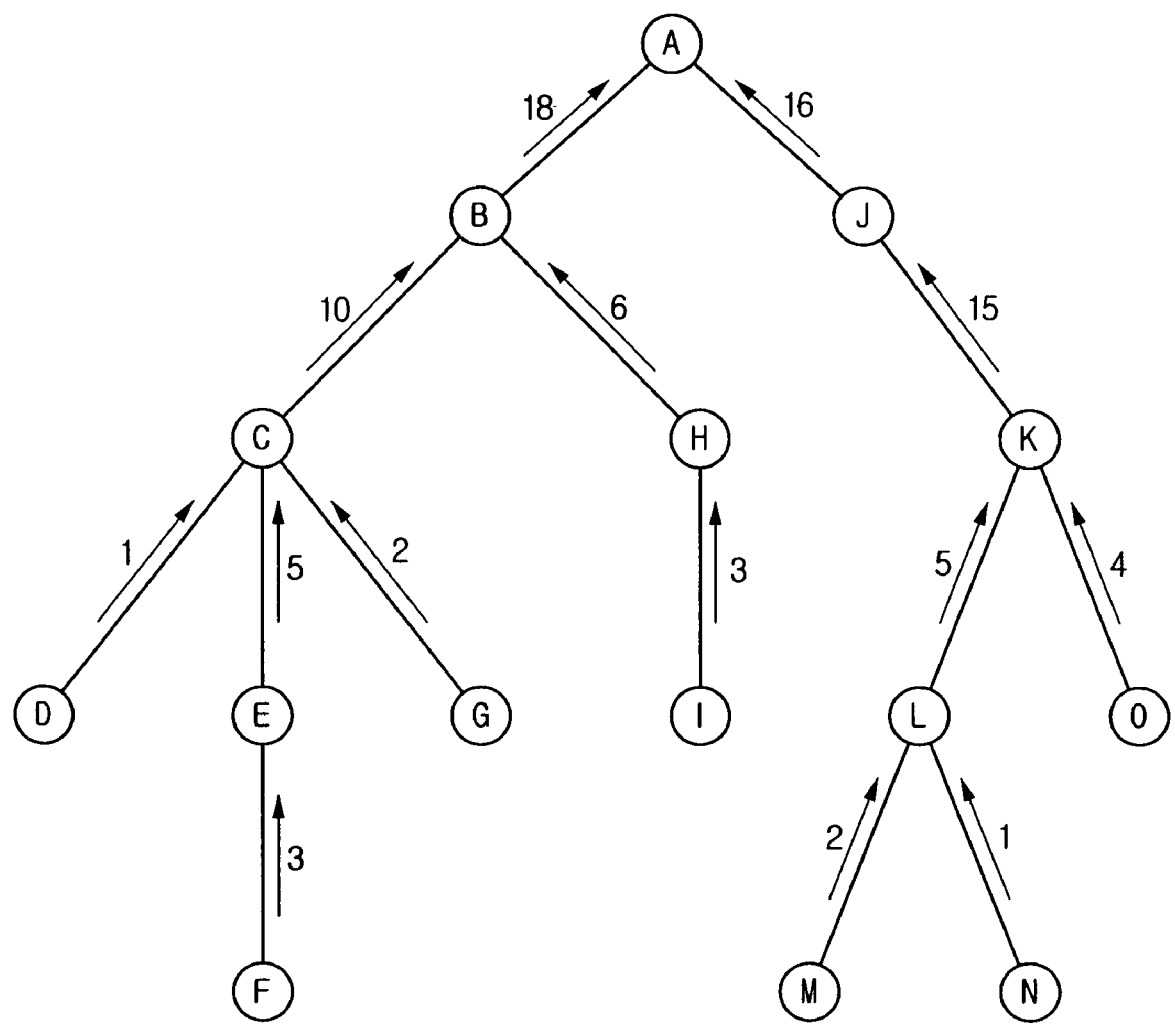

FIG. 4 diagrammatically illustrates that each node informs its parent node of a desirable number of addresses it needs. Referring to FIG. 4, nodes F, M and N in the lowest level of the tree indicate they wish to get three addresses, two addresses and one address, respectively. For example, the node F informs its parent node (node E) that it wishes to get three addresses (one for itself, and two for possible future extension). On the other hand, the node N indicates it wishes to get only one address. The size of an address block can be varied by capabilities of nodes. For instance, if a node has no routing function, child nodes cannot be attached to it. In this case, the node requests only one address for itself. Another factor of the address block size is power capacity of a node. For instance, if a node uses a battery and is not plugged into electric outlet, power capacity of the node is limited so it may not be able to have as many child nodes as it wishes. In this case, therefore, the address block size is set small. On the other hand, if the node is plugged into electric outlet, it can request a relatively large number of addresses (i.e., large address block).

When nodes inform their parent nodes of desirable number of addresses, they add the number of addresses for their child nodes and the number of addresses for their future extensions. In this manner, the ultimate ZigBee coordinator (i.e., the node A) of the highest level of the tree receives the information from all the branches. In result, the node A assigns 18 addresses to the first branch and 16 branches to the second branch.

Figure 5:
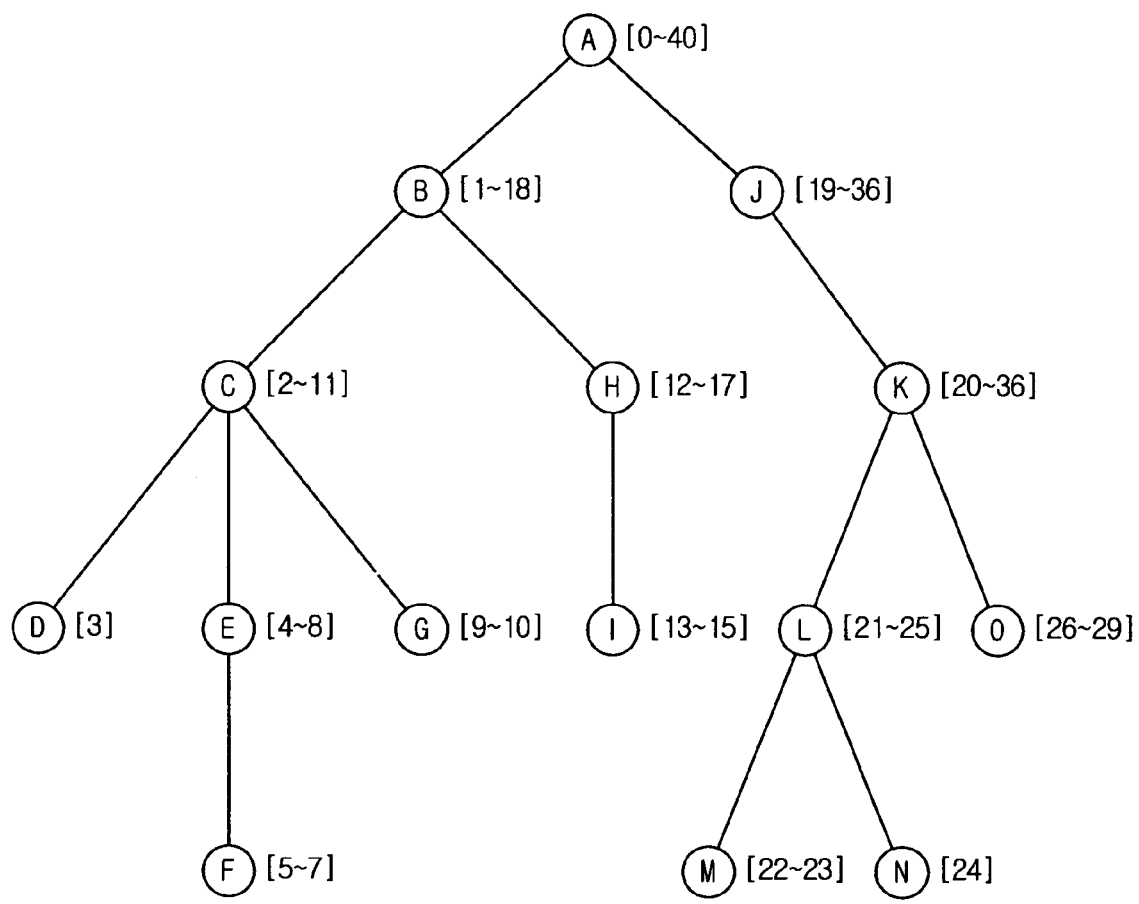

FIG. 5 illustrates address assigning stage using a top-down procedure. Referring to FIG. 5, the node A assigns a block of consecutive addresses to each branch below it. That is, if a node B is the first child node of the node A, the node A assigns an address block [1-18] after its own address 0. Then, the node B uses the first address 1 for itself and assigns address blocks [2-11] and [12-17] to its child nodes C and H, respectively, in order of acceptance. The node B is assigned an address block [1-18], so that address block [18] is reserved for future extension. The nodes C and H also assign address blocks to their child nodes as requested. This address assigning procedure continues until the bottom of the tree.

In like manner, an address block [19-36] is assigned to a node J of the second branch. The node J assigns the address block to its child nodes in order of acceptance. Referring to FIG. 5, the node A owns address block [0-40]. Therefore, address block [37-40] is left after assigning addresses to its descendents. The address block [37-40] is reserved for possible future extension of the node A.

Figure 6:
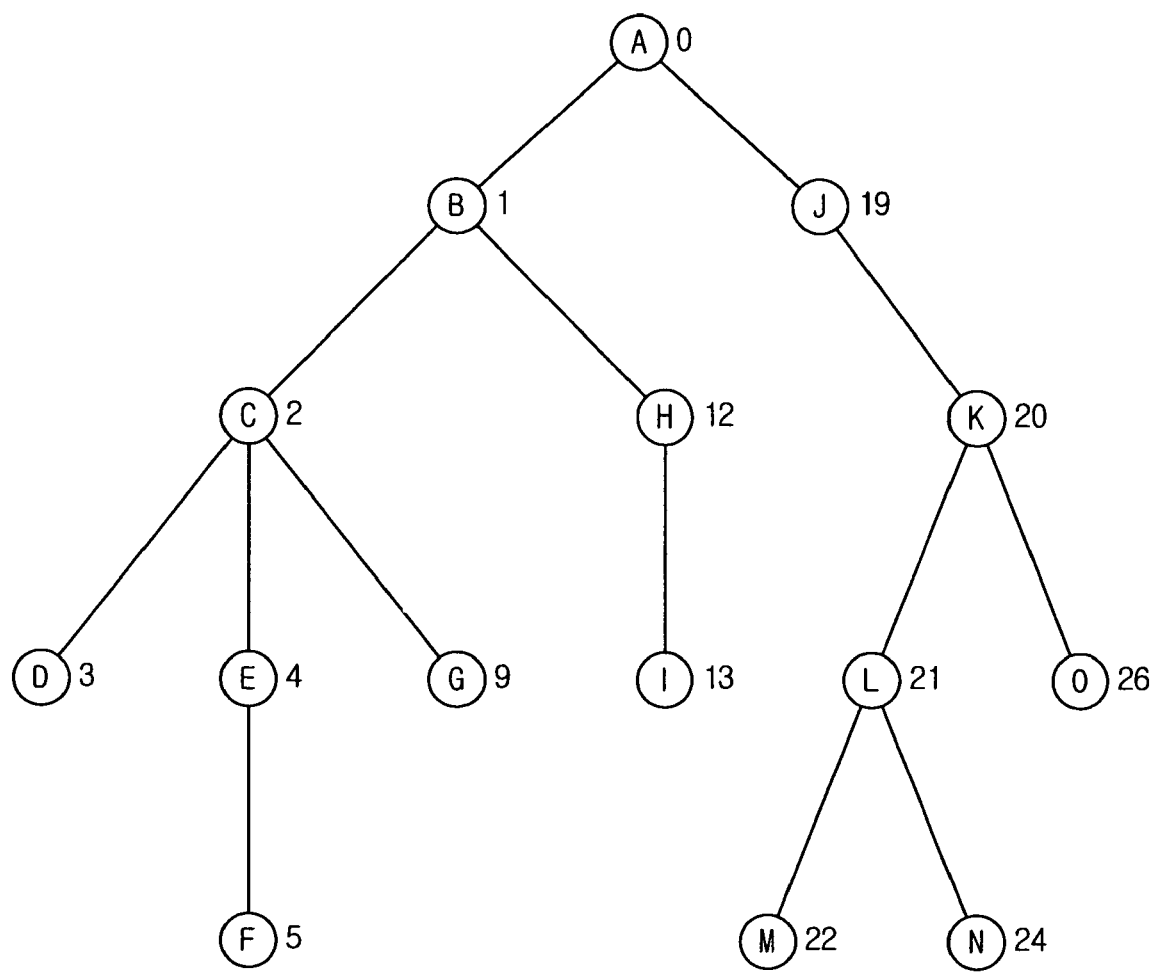

FIG. 6 diagrammatically illustrates a cluster-tree structure including nodes with final addresses assigned to them. As shown in the drawing, the nodes A, B, C, D, E, F, G, H, I, J, K, L, M, N and O are assigned addresses 0, 1, 2, 3, 4, 5, 9, 12, 13, 19, 20, 21, 22, 24 and 26, respectively.

Each node assigns branch IDs to its child nodes, and produces and stores its ARTT that contains a record of address blocks assigned to braches. As such, routing operation can be performed after address assignment. Table 1 shows an ARTT stored in the node A.

TABLE 1

| Branch ID | Initial address | Final address |
|---|---|---|
| 1 | 1 | 18 |
| 2 | 19 | 36 |

As can be seen in Table 1, the ARTT includes branch IDs that are consecutively provided to child nodes, and initial and final addresses of address blocks assigned to branches, respectively. For instance, branch 1 of the node A is assigned an address between [1-18], and branch 2 of the node A is assigned an address between [19-36].

Table 2 shows another example of an ARTT stored in the node H.

TABLE 2

| Branch ID | Initial address | Final address |
|---|---|---|
| 1 | 13 | 15 |

Although not shown in Tables 1 and 2, the total number of branches can also be recorded in the ARTT.

Figure 7:
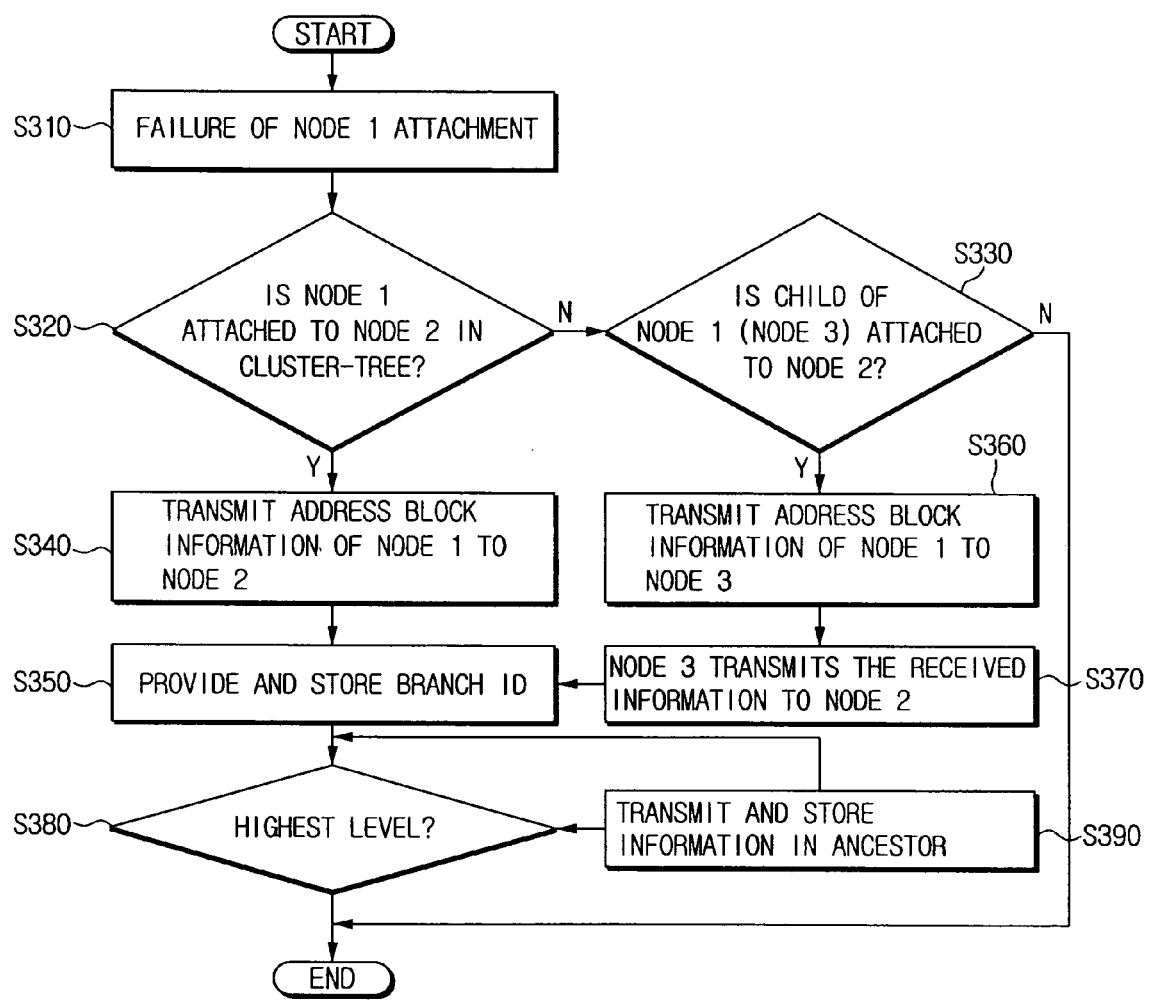
FIG. 7 is a flow chart explaining a tree recovery method for use in link failure between nodes in a ZigBee network environment.

FIG. 7 is a flow chart explaining an address assigning method after link failure between the nodes having addresses as in FIG. 3 to FIG. 6 in a ZigBee network environment. Referring to FIG. 7, when a node 1 in a ZigBee network of the cluster-tree structure is detached (S310) and attached to a node 2 at a certain level of the cluster-tree structure (S320), address block information of the node 1 is transmitted to the node 2 (S340).

Assuming that the node 2 is not an ancestor node (such as a parent node) of the node 1, the node 2 provides a new branch ID to a branch that the node 1 used to be attached (S350). Accordingly, based on the address block information from the node 1, the node 2 stores the initial and final addresses of the address block and the new branch ID in an ARTT (S350). On the other hand, if the node 2 was the ancestor node of the node 1, there is no need for the node 2 to receive information from the node 1, so the node 2 uses old information of the node 1 that has been stored in its ARTT.

If the attachment of the node 1 fails, a child (i.e., a node 3) of node 1 can be attached directly to the cluster-tree structure. If this is the case, namely, the node 3 (therefore a child node of the node 1) is attached to the node 2 (S330), levels of the node 1 and the node 3 are changed. This time the node 1 becomes a child node of the node 3. When this happens, the node 1 transmits its address block information to the node 3 (S360). Then, the node 3 provides a new branch ID to the node 1, and stores address block information (i.e., initial and final addresses) except for its own address block and the branch ID in its ARTT (S360).

Next, the node 3 transmits the information from the node 1 to the node 2 (S370). The node 2 provides a new branch ID to the node 3, and stores the received information and the branch ID in its ARTT (S350).

If the node 2 is not the root (i.e., the ultimate ZigBee coordinator) (S380), the node 2 must transmit the information transmitted from the node 1 to its parent node (S390). Since it is not like having a new branch, the parent node of the node 2 provides a virtual branch ID to the transmitted information. After that, the parent node of the node 2 stores the virtual branch ID and the information (inclusive of initial and final addresses) in its ARTT (S390). This procedure continues until the ARTT update is made in the ultimate ZigBee coordinator also. In short, nodes in a ZigBee network environment are capable of recovering or repairing broken branches of the tree, while keeping their old addresses.

Figure 8:
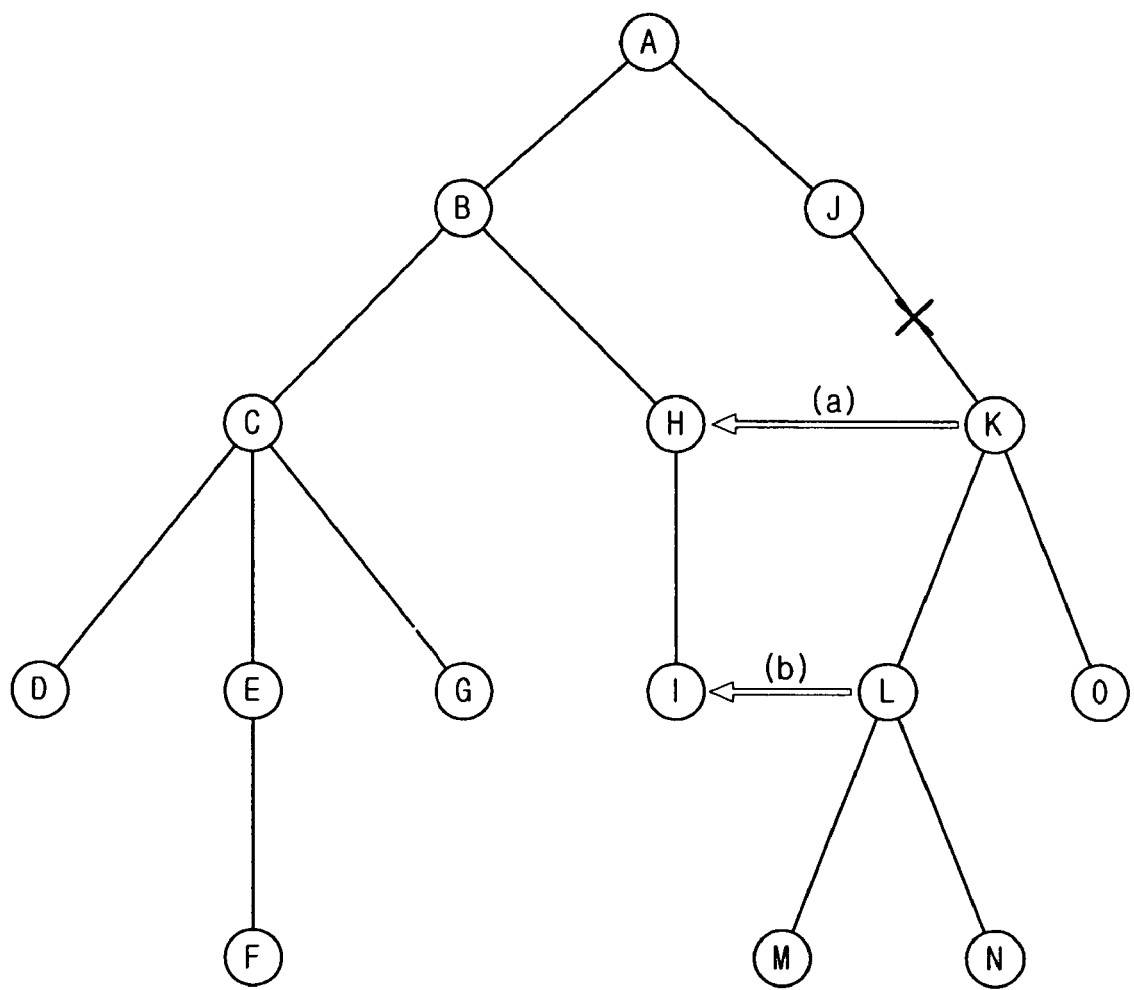
FIG. 8 diagrammatically illustrates a tree recovery procedure for use in link failure between nodes in a ZigBee network environment.

FIG. 8 is a diagram provided to more effectively explain the method in FIG. 7. For example, in FIG. 8, the link between the nodes J and K breaks down. Thus, the node K sends an association request message to other nodes.

Looking at link (a) first, the node K transmits its address block information [20-36] to the node H. Then, the node H provides a new ID for the branch between the nodes K and H, and stores the information from the node K in its ARTT. In result, Table 2 is updated as follows.

TABLE 3

| Branch ID | Initial address | Final address |
|---|---|---|
| 1 | 13 | 15 |
| 2 | 20 | 36 |

The node H transmits the information from the node K to its ancestor node (or parent node) node B. Node B provides a virtual branch ID to the information and stores the virtual branch ID and the information in its ARTT. As a result, the ARTT of the node B is updated as follows.

TABLE 1

| Branch ID | Initial address | Final address |
| --- | --- | --- |
| 1 | 2 | 11 |
| 2 | 12 | 17 |
| -2 | 20 | 36 |

As can be seen in Table 4, the virtual branch ID is expressed by adding (-) to the old branch ID. The virtual branch ID -2 indicates that a new node from a lower level has been attached.

The node B transmits the information from the node H to its ancestor node, namely the node A. From a viewpoint of the node A, the information is transmitted through its first branch. Thus, the node A provides the information with a virtual branch ID -1, and stores the virtual branch ID and the information in its ARTT.

In the meantime, the node J detached from the node K must update its own ARTT in order to perform normal routing. That is, it must record that the node K is no longer its descendent. To this end, the node J provides a virtual branch ID 0 to the address block information of the node K, and adds the virtual branch ID and the information in its ARTT. Virtual branch ID 0 is an ID designated for packet routing to a parent node. The routing operation using the ARTT will be detailed later.

Looking at link (b) where the node L, a child node of the node K, is attached to the node I. In this case, the node K is treated as a descendent of the node L. Thus, the node L provides a new branch ID to the node K. The node K transmits its address block information to the node L. Then, the node L stores the address block information except for its own address block and the new branch ID in its ARTT.

TABLE 5

| Branch ID | Initial address | Final address |
| --- | --- | --- |
| 1 | 22 | 23 |
| 2 | 24 | 24 |
| 3 | 26 | 36 |

Table 5 shows the updated ARTT of the node L.

As can be seen in Table 5, branch ID 3 is given to the node K.

The node I provides the node L with branch ID 1, and stores initial and final addresses of the address information from the node L. Ancestor nodes H, B and A of the node I, too, add virtual branch IDs in their ARTTs, respectively, based on the address information from the node L. This procedure is similar to that of link (a).

Figure 9:
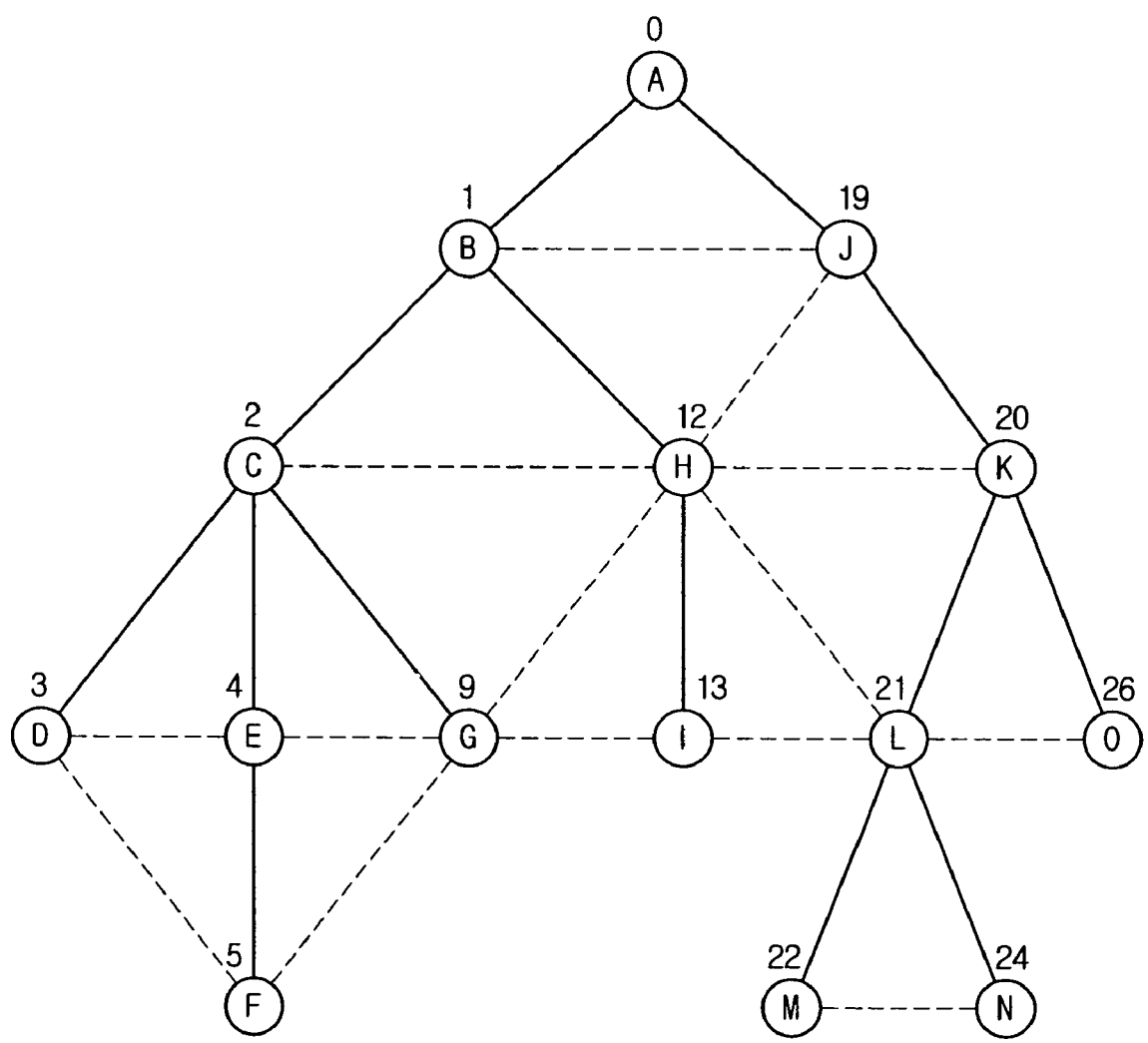
FIG. 9 is a diagram illustrating a meshed-structure ZigBee network environment.

FIG. 9 illustrates a ZigBee network environment in meshed structure. In the meshed structure, a node is able to route a packet directly to another node at the same level without going through ancestor nodes. As shown in FIG. 9, unlike in the cluster-tree structure, nodes are now attached to nearest nodes at the same level to form a meshed structure. In this case, a node treats these new nodes as its child nodes, and records their information in its ARTT. This feature makes it possible to route a packet through a shorter path without going through ancestor nodes. For instance, suppose that a packet needs to be transmitted from the node E to the node H. Then, the packet routing path will be E-C-H instead of E-C-B-H.

Figure 10:
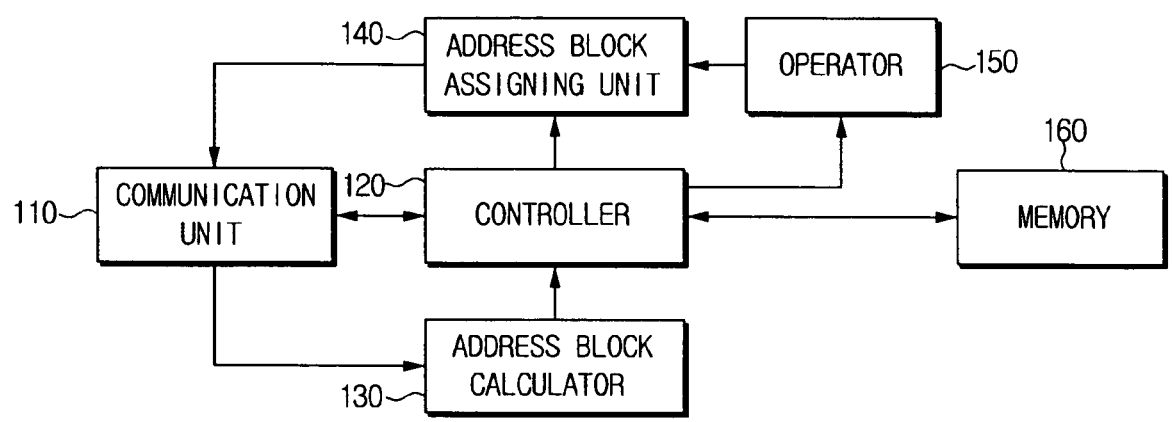
FIG. 10 is a schematic block diagram of a ZigBee network device in accordance with an exemplary embodiment of the present invention.

FIG. 10 is a schematic block diagram of a ZigBee network device in the cluster-tree structure according to an exemplary embodiment of the present invention. Referring to FIG. 10, the device includes a communication unit 110, a controller 120, an address block calculator 130, an address block assigning unit 140, an operator 150, and a memory 160.

In the cluster-tree structure, the communication unit 110 is linked to nodes at high and low levels in the tree for communications therebetween. The communication unit 110, to construct the cluster-tree structure, transmits/receives association requests and association responses to/from peripheral nodes. As described before, a device (or node) uses a four level (0-3) acceptance degree to indicate the willingness of acceptance of an association request.

When the controller 120 receives association requests from a plurality of child nodes through the communication unit 110, it chooses the node with the highest acceptance degree for association. And the controller 120 controls the communication unit 110 to transmit an association response to the chosen node.

The address block calculator 130, the address block assigning unit 140 and the operator 150 are means for assigning addresses after the cluster-tree structure is constructed.

In detail, when a node at a lower level requests a desirable number of addresses through the communication unit 110, the address block calculator 130 calculates an address block size that can be assigned from a parent node of the node. For instance, assume that a plurality of child nodes are attached to the common parent node (or ancestor node). Then, the address block calculator 130 calculates an address block size that is large enough to assign to the child nodes as they wished and for possible future extension.

Once the desirable address block size is calculated, the controller 120 controls the communication unit 110 to forward the calculation result to the parent node.

The address block assigning unit 140 assigns address blocks from the parent node to child nodes as they wished, respectively, in order of acceptance.

If a certain node belongs to the highest-level in the cluster-tree structure, it is an ultimate ZigBee coordinator. Since the ultimate ZigBee coordinator does not have any ancestor nodes, it is responsible for the calculation of total address block size to be used by controlling the operator 150. For the calculation, the operator 150 substitutes predetermined network parameters for the following equation.

$$S = \{s, s + B_L\} \quad \text{[Equation 3]}$$

$$B_L = \frac{1 - Cm^{Lm+1}}{1 - Cm}$$

where, S is a total address block, s is an address of a node, $B_L$ is a total address block size, Cm is a network parameter indicating a maximum number of child nodes along a branch, and Lm is a network parameter indicating a maximum level (or depth) in the cluster-tree structure.

In brief, the operator 150 calculates the total address block, and the address block assigning unit 140 assigns address blocks to nodes in order of acceptance.

The memory 160 stores a routing table (i.e., an ARTT) that contains a record of the number of child nodes attached to the node, branch IDs that are consecutively given to the child nodes in order of acceptance, and address block information assigned to each child. When a packet is transmitted through the communication unit 110, the controller 120 refers to the routing table in the memory 160 to route the packet to its destination cluster.

If the link between the communication unit 110 and a node breaks down and the communication unit 110 is attached to another node, the controller 120 provides the routing information in the memory 160 to the new node, so that the new node can record address information of the old node in its routing table.

Also, if a node detached from another node, say, an old node for example, is attached to the communication unit 110, the controller 120 provides a branch ID or virtual branch ID to the old node and stores address information of the old node in the memory 160. In this manner, during link recovery the old address can be used again for routing.

Figure 11:
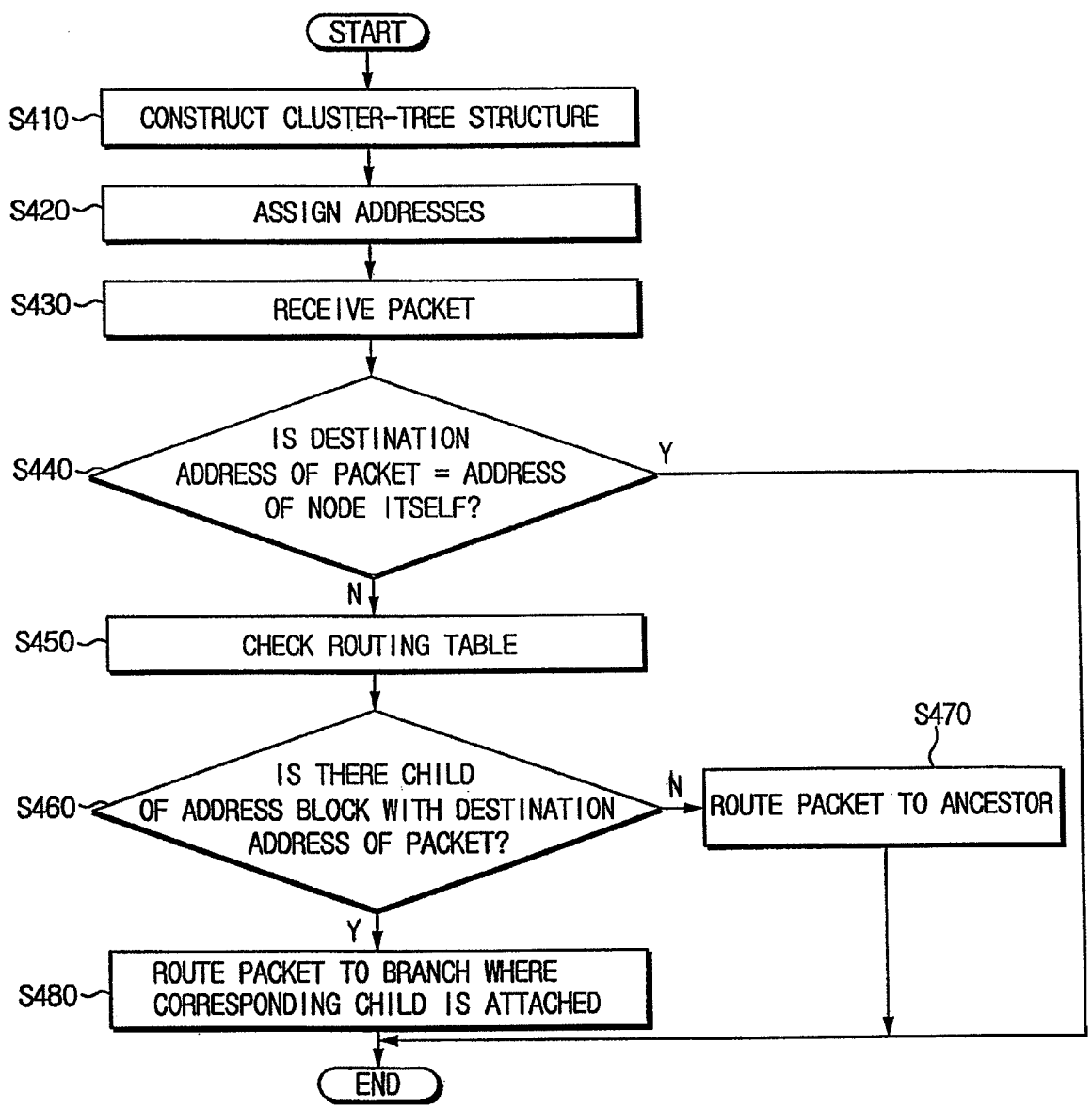
FIG. 11 is a flow chart explaining a routing method in a ZigBee network environment in accordance with an exemplary embodiment of the present invention.

FIG. 11 is a flow chart explaining a routing method of the ZigBee network device according to an exemplary embodiment of the present invention. Referring to FIG. 11, when a cluster-tree structure is formed (S410), addresses are assigned to the nodes in the cluster-tree structure (S420). The address assigning method here is similar to that of FIG. 2.

When the device (or node) receives a packet destined for a certain node (S430), it checks whether the packet is destined for itself. In other words, the node checks a destination address of the packet is the same as its own address (S440). If the destination address of the packet is the same as its own address, the node reads information from the body of the packet, and executes corresponding operations.

If the destination address of the packet is not the same as its own address, however, the node refers to the routing table in the memory 160 (S450) to check whether the routing table has a record of address block information containing the destination address of the packet (S460).

If the destination address of the packet is recorded in the routing table, the node routes the packet to a branch of the corresponding address block (S480). Then, a destination node having received the packet checks whether the packet is indeed destined for itself. If it turns out that the packet has been routed mistakenly, the node refers to the routing table so as to route the packet to a correct branch with the corresponding address block.

However, if the destination address of the packet is not recorded in its routing table, the node routes the corresponding packet to its ancestor node (S470). The ancestor node of the node also checks its routing table to find out whether the address block information containing the destination address is recorded in the routing table. This procedure is continued until the packet is routed to a correct destination node.

As explained above, ZigBee network devices (or nodes) form the cluster-tree structure together, and are assigned addresses, respectively. In this manner, the whole address block can be used more efficiently. Moreover, according to the present invention, old addresses can be used again for tree recovery or for attaching a new node. Accordingly, time and power waste due to address re-assignment can be saved markedly.

The foregoing exemplary embodiments and advantages are merely illustrative and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An address assigning method in a network environment formed of a plurality of nodes, the method comprising:
    linking the plurality of nodes in a cluster-tree structure;
    requesting that ancestor nodes provide desired address blocks, from a lowest level of nodes to a second highest level of nodes of the cluster-tree structure;
    assigning the desired address blocks to descendent nodes using a top-down procedure; and
    in each node from a highest level of nodes to a second lowest level of nodes of the cluster-tree structure, storing a routing table that contains a record of a number of child nodes, branch identifiers (IDs) provided to the child nodes by acceptance order, and address blocks assigned to the child nodes,
    wherein the assigning of the desired address blocks comprises a parent node consecutively assigning address blocks of desired sizes to child nodes in an order of attachment,
    the method further comprising:
    breaking down a branch between a first node and a higher level node of the first node;
    attaching the first node to a second node among peripheral nodes;
    transmitting information contained in a routing table of the first node from the first node to the second node;
    transmitting a branch ID from the second node to the first node, and recording the branch ID and the information in a routing table of the second node;
    transmitting the information from the second node to a parent node of the second node; and
    in the parent node of the second node, providing a virtual branch ID to the information, and recording the virtual branch ID and the information in a routing table of the parent node of the second node.

2. The method according to claim 1 further comprising:
    attaching a third node, which is a child node of the first node, to a fourth node in the cluster-tree structure;
    transmitting the information contained in the routing table of the first node from the first node to the third node;
    storing the information from the first node in a routing table of the third node;
    transmitting information in the routing table of the third node from the third node to the fourth node;
    providing a branch ID from the fourth node to the third node, and recording the branch ID and the information in a routing table of the fourth node;
    transmitting the information from the fourth node to a parent node of the fourth node; and
    in the parent node of the fourth node, providing a virtual branch ID to the information, and recording the virtual branch ID and the information in a routing table of the parent node of the fourth node.

3. The method according to claim 1 further comprising:
    attaching a plurality of nodes at a same level of the cluster-tree structure together to form a meshed structure;
    if another node at the same level is attached, providing a branch ID to the another node;
    receiving information from a routing table of the another node; and
    in the plurality of nodes in the meshed structure, storing the branch ID and the information in corresponding routing tables.

4. The method according to claim 1, wherein the linking the plurality of nodes in the cluster-tree structure comprises:
    in each of the plurality of nodes, setting an acceptance degree for association with other nodes;
    in a first node, receiving from at least one peripheral node an association request with an acceptance degree for association;

in the first node, choosing a node based on an acceptance degree of the association request; and in the first node, transmitting an association response to the node which is chosen, and forming a branch with the node which is chosen.

5. A network device in a cluster-tree structure for a network environment, the device comprising:

a communication unit communicably linked to an ancestor node and a plurality of child nodes in the cluster-tree structure;

an address block calculator which calculates a desired size of an address block including address blocks requested by the child nodes;

a controller which controls the communication unit to request the ancestor node to provide the address block in the desired size;

an address block assigning unit which receives the address block in the desired size from the ancestor node and assigns parts of the address block to the child nodes in order of attachment; and an operator which calculates a total address block using predetermined network parameters if the communication unit is not attached to the ancestor node., the address block assigning unit divides the total address block and assigns parts of the address block to the child nodes in order of acceptance.

6. The device according to claim 5, wherein the operator calculates the total address block as follows:

$$S = \{s, s + B_L\}$$

$$B_L = \frac{1 - Cm^{Lm+1}}{1 - Cm}$$

where, S is the total address block, s is an address of a node, BL is a total address block size, Cm is a network parameter indicating a maximum number of child nodes along a branch, and Lm is a network parameter indicating a maximum level in the cluster-tree structure.

7. The device according to claim 5 further comprising a memory which stores a number of child nodes, branch identifiers (IDs) provided consecutively to the child nodes, and a routing table containing a record of address blocks assigned to the child nodes.

8. The device according to claim 7, wherein, if a packet is received by the communication unit, the controller checks a destination address of the packet, searches the routing table in the memory to find a child node that is assigned an address block containing the destination address, and if the child node is found, the controller controls the communication unit to route the packet to the child node.

9. The device according to claim 8, wherein, if the child node is not found, the controller controls the communication unit to route the packet to the ancestor node.

10. The device according to claim 8, wherein, if the controller receives information from a routing table of a node communicably linked to the communication unit, the controller provides a branch ID to the node communicably linked to the communication unit, and records the branch ID and the received information in the routing table of the memory.

11. An address assigning method comprising:

connecting a plurality of devices in a tree structure;

receiving at a device of the plurality of devices a request for an address block from one or more child devices of the device;

requesting that a parent device of the device provide a plurality of addresses corresponding to a sum of sizes of the address blocks requested by the one or more child devices;

receiving from the parent device the plurality of addresses corresponding to the sum; and assigning to the one or more child devices the address blocks requested by the one or more child devices among the plurality of addresses received from the parent device.

* * * * *